Nov. 3, 1959     D. D. PEEBLES     2,911,300
MILK MANUFACTURING METHOD AND PRODUCT
Filed Nov. 2, 1954
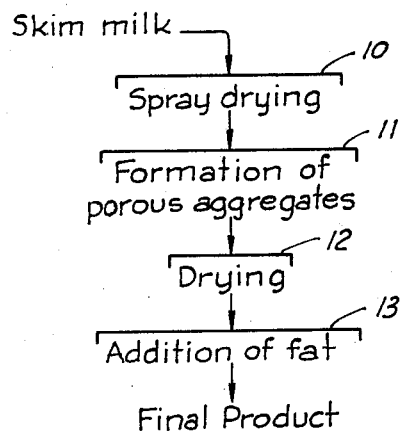
FIG_1_
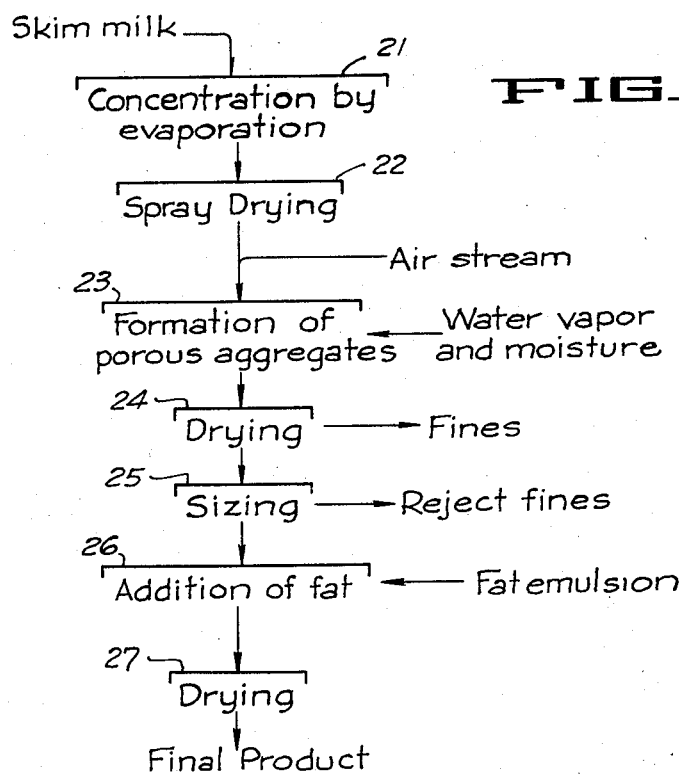
FIG_2_
INVENTOR.
DAVID D. PEEBLES
BY
ATTORNEYS United States Patent Office 2,911,300
Patented Nov. 3, 1959

2,911,300

MILK MANUFACTURING METHOD AND PRODUCT

David D. Peebles, Davis, Calif., assignor, by mesne assignments, to Dairy Foods Incorporated, Los Angeles, Calif., a corporation of California Application November 2, 1954, Serial No. 466,421

13 Claims. (Cl. 99—56)

This invention relates generally to methods for the manufacture of dry fat containing milk products, and to products resulting from such methods.

Fat containing dry milk products such as whole milk or cream, produced by conventional spray drying processes, possess characteristics that tend to limit their use. In particular such powdered products cannot be readily dispersed in water to produce a reconstituted milk or cream, without considerable agitation or beating. This is attributed largely to the fact that the powder is not readily wettable, and because there is a tendency for the powder particles to adhere together into the form of sticky lumps, thus retarding homogeneous dispersion. A further characteristic of such conventional products is that they are not free flowing. This places a limitation upon the type of container in which the material can be marketed, and interferes with ease of handling and measuring.

In general it is an object of the present invention to provide a dry fat containing milk product which avoids the objectionable features of conventional products of the character mentioned above.

More particularly it is an object of the present invention to provide a dry fat containing milk product which has high wettability, which can be readily dispersed in water to form a reconstituted milk, and which has free flowing characteristics.

Another object of the invention is to provide a product of the above character which can be mixed with water to a good quality reconstituted milk.

Another object of the invention is to provide a novel method for the manufacture of the above product.

Additional objects and features of the invention will appear from the following description in which the preferred embodiment has been set forth in detail in conjunction with the accompanying drawing.

Referring to the drawing:

Figure 1 is a flow sheet illustrating a general method for manufacture of the product.

Figure 2 is a more elaborate flow sheet illustrating a particular way in which the method can be carried out.

In accordance with the present method a non-fat milk material such as liquid skim milk is first spray dried in a conventional manner to produce an ordinary spray dried powder. As is well known to those familiar with the properties of conventional spray dried skim milk powder, it resists wetting, it does not readily disperse in water, and it is not free flowing. Its particle size is such that the bulk of the powder will pass through a 200 mesh screen. This powder is then subjected to special treatment involving the formation of porous aggregates from its individual particles. Thereafter a desired fat content is added, preferably in the form of a fat-water emulsion.

The method employed for converting the conventional spray dried powder to one comprising porous aggregates formed from the particles of the original powder, is preferably that disclosed in co-pending application Serial No. 370,420, filed July 27, 1953, and entitled "Dried Milk Product and Method of Making Same," now Patent No. 2,835,568 of May 20, 1958. Briefly the method disclosed in that application involves causing a powder to be delivered into a treatment chamber together with a current of air, and then co-mingling the powder with warm moisture. The individual particles are wetted and thereby caused to be temporarily sticky. The sticky particles are made to contact and adhere together to form random aggregates. The material drops from the treatment chamber in the form of a light fluffy mass, which is subjected to drying to remove excess moisture. Thereafter the material is subjected to screening or other form of classification to produce a material conforming to desired size specifications.

Figure 1 illustrates the general method for the manufacture of my product, assuming use of the procedure disclosed in said application Serial No. 370,420. A nonfat liquid milk, such as raw skim milk of good edible quality, is supplied to the conventional spray drying operation 10. If desired the skim milk can be subjected to some preliminary concentration before spray drying. Preferably treatment of the liquid skim milk, and the control of the spray drying operation, are such as to produce a good quality powder having a relatively low solubility index. By "solubility index" I have reference to the index number obtained by recognized tests for insoluble solids, such as is specified by The American Dry Milk Institute, and which determines the amount of insoluble solids present when a particular powder is reconstituted with water. Thus I can use a powder having a solubility index of the order of 0.10 or less. In a typical instance such a skim milk powder may analyze about 36% protein, 52% lactose, 8% ash and 4.0% total moisture. The lactose content is amorphous or glass like. Such powder is composed mainly of single particles (such as whole or broken hollow spheres) less than 60 microns in size.

In step 11 the skim milk powder is treated to effect formation of porous aggregates from the powder particles, namely the treatment disclosed in said application Serial No. 370,420, and this is accompanied by a large increase in bulk volume, which can be referred to as a puffing of the powder. In practice step 11 can be carried out by conveying the powder in a stream of air, and introducing the same into a chamber where the powder is caused to co-mingle with continuously introduced warm water vapor and atomized droplets of water. The procedure is such that moisture is rapidly and effectively distributed to the surfaces of the powder particles, with the result that momentary surface stickiness results and the particles are caused to contact and adhere together at random, thereby forming porous aggregates of substantial size and random shape. The moisture combines with certain soluble components of the powder to provide the desired surface stickiness, thereby making possible the resulting random attachment between the particles.

After removal of the moist and puffed material from the treatment chamber, it is subjected to drying at 12 for the purpose of removing excess free moisture. For example in a particular instance where the material from the treatment zone may have from 15 to 18% total moisture, drying serves to reduce the total moisture content to a value of say 3 to 6%.

In step 13 a fat content is added to the powdered material from step 12. Assuming the use of a fat having a melting point above room temperature, it can be melted and atomized into a zone through which the powder is falling. Some agitation of the powder, as by treatment in a rotating drum or on a shaking table, may be applied to more homogeneously distribute the fat. Also it is desirable that the fat be added in such a manner that it is effectively absorbed into the pores of the porous aggregates. Absorption of the fat is promoted by heating whereby it is applied in atomized and molten form, and by having the particles of the solid material at a temperature above the melting point of the fat, as by conveying it in a warm current of air. Thus the fat (assuming purified butter) can be at a temperature of from 100° F. to 150° F., and the dry milk at a temperature of from 70° F. to 150° F. Another procedure which can be employed for effective absorption of the fat is to subject the material to a temperature above the melting point of the fat, after the fat has been applied to the surfaces of the particles.

When a simple fat is applied to the material as described above, a product is formed which can be readily dispersed in warm water to form a reconstituted milk. The material has high wettability and readily disperses in warm water without vigorous agitation or shaking. After dispersion in warm water, the reconstituted milk upon standing is subject to some fat separation. If the reconstituted milk is subjected to conventional homogenizing treatment, such separation is avoided.

Separation of fat upon making a reconstituted milk, as described above, can be prevented by supplying the fat in the form of a suitable fat-water emulsion. The emulsion should be relatively stable, and its constituents and method of preparation should be such as to avoid flavor impairment. The fat-water emulsion disclosed in Peebles et al., 2,622,984 can be used for this purpose. Briefly it consists of fat and water together with a small amount of a soluble caseinate such as sodium caseinate. As pointed out in said patent the proportioning of the ingredients may vary, but in a typical instance it may consist of about 50% fat, 47% water, and about 3% of sodium caseinate. One objection to such an emulsion is that it is sensitive to pH, and thus a reconstituted milk when added to hot coffee may be subject to feathering. A fat water emulsion which avoids this difficulty can be made by the use of non-ionic organic surface active agents, such as polyoxyethylene derivatives of hexitol anhydride partial long chain fatty acid esters. An example of such an agent is Tween (e.g. Tween 80) made by Atlas Powder Co. Small amounts of this agent (e.g. 0.5% of fat can be substituted for sodium caseinate, or may be used with the latter. Another suitable emulsifying agent is lecithin, when used in suitable amounts such as 2% of the fat content.

The fat-water emulsion is atomized and applied to the aggregates of the dry skim milk in the same manner as previously described. Preferably at the time of application the emulsion is at a temperature above the melting point of the fat employed, as for example a temperature of the order of 120° F. for a butter fat emulsion.

The product obtained by application of fat emulsion in the manner described above readily disperses in warm water in the same manner as previously described, and the resulting reconstituted milk is not subject to fat separation. The fat forms a stable emulsion in the reconstituted milk, thus making it unnecessary to subject the material to homogenizing treatment.

In Figure 2 I have illustrated a more elaborate procedure which makes use of fat emulsion. The raw skim milk is concentrated by evaporation at 21 (e.g. to from 20 to 40% solids) and then subjected to conventional spray drying at 22. A stream of conveying air is indicated for conveying this powder, which may or may not be mixed with a small amount of crystallized lactose, to the treatment zone for formation of porous aggregates in step 23.

The power and air used for conveying the powder to step 23 can be at ordinary room temperatures of say 60 to 80° F. Water vapor and moisture distributed to the particles of powder in the treatment zone of step 23 can be in the form of saturated steam, together with finely atomized droplets of water. A desirable control over the treatment operation can be had by adjusting the ratio between the atomized water and steam. This provides a convenient way to control the temperature in the treatment zone. As the particles of skim milk powder are co-mingled with the vapor and atomized water, moisture distributes itself on the surfaces of the powder particles, thus applying to the particles a sufficient amount of water to produce a temporary surface stickiness. The amount of moisture applied in this manner can be such as to provide a total moisture content of from 10 to 20%, about 15 to 18% being optimum. The preferred temperature level of the treatment zone is of the order of 80 to 120° F.

Substantially simultaneously with providing a surface stickiness for the individual powder particles, the articles are co-mingled in such a manner that contacts between particles causes them to adhere together in the form of porous aggregates of random shape. The aggregates are made up of a great number of power particles, and vary in over-all size.

The total time period for step 23 may range from 5 to 60 seconds for the type of equipment disclosed in said co-pending application. In addition to forming porous aggregates during this interval, some of the more readily soluble components of the powder pass into solution to form the sticky coating.

As the porous aggregates are initially formed, they are soft and will not stand mechanical handling. These aggregates must therefore be permitted to rest without handling, as for example on a moving belt, until the structures have become firm. This period of rest may vary depending upon temperature and moisture, from 1 second to several minutes. After the period of rest the material is definitely less sticky, it is relatively free flowing, and the aggregates have sufficient strength for handling, drying and sizing without serious breakup or crushing.

All of the treatment steps are carried out under such temperature and time conditions as to avoid any substantial increase in the amount of insoluble material in the product. In this manner I avoid any substantial increase in the solubility index. Assuming an average temperature in the treatment zone of the order of 100° F., and a total moisture content of the product of about 15%, it has been found that no noticeable increase in the solubility index occurs over a total holding time approaching 30 minutes.

While various procedures can be used for removing excess moisture in operation 24, after the rest period, it is desirable to avoid such mechanical handling as may cause serious grinding or excessive crushing of the aggregates. Also it is desirable to avoid any substantial increase in the amount of insoluble material in the product, such as coagulated protein. Assuming that the product is dried in contact with air, the temperature of the air can be of the order of from 200 to 300° F., from 230 to 250° F. being deemed optimum. The temperature levels and drying period of drying can vary but must be controlled to avoid the creation of undesirable amounts of insoluble material such as coagulated protein and the creation of foreign flavors due to overheating. The moisture content of the product after such drying can be of the order of from 3 to 6% (total).

As described in said application Ser. No. 370,420 a desirable drying procedure is to convey the moist material to a screen provided with small perforations, and which is vibrated to cause the material to progress from the feed to the discharge end of the same, and to apply vertical motion to maintain the powder as a loose working layer. In conjunction with the vibrating action, a warm drying air is delivered upwardly through the screen to pass upwardly through the layer of powder. The number and size of the openings in the screen are so chosen in relation to the rate of air delivery therethrough that the product moving along the screen is fluffed to form a layer several times the thickness is would normally have if at rest. By this technique the product is caused to progress along the screen and is at least partially supported by the cushion of air intermingled therewith. This provides drying action without rough mechanical handling which might break up the aggregates. A small amount of relatively fine sized powder is carried away from the drier in the drying air stream. The removal of such fine material is indicated in Figure 2, and provides a material containing crystallized lactose which can be returned to the process. For example it can be co-mingled with the spray dried powder entering the step 23.

A sizing operation 25 can be carried out by the use of suitable screening equipment. The reject material from this operation can for example be sufficiently fine to pass through an 80 mesh screen. Material which is larger than desired can be subjected to crushing and returned for sizing. In a typical instance sizing can result in a product having a particle size such that about 80% remains on a 200 mesh screen, and all in excess of 74 microns. The specific gravity of this material is of the order of from 0.27 to 0.39 (preferably about 0.32) as distinguished from about 0.6 for ordinary spray dried skim milk powder. The solubility index is substantially the same as that of the original skim milk powder, and the extent of hydration of the lactose is from 30 to 62%. The hydrated lactose is in the form of a crystalline monohydrate.

In the next step 26 a fat emulsion is applied to the dry and sized material. The sized material can be fed into the upper end of a treatment chamber, and caused to drop downwardly through a zone into which fat emulsion is atomized. The fat emulsion is thus distributed upon the surfaces of the sized material, with proportions being such that the desired fat content is obtained. Assuming that the amount of emulsion added and its moisture content are not excessive, the resulting material having the emulsion applied to its surfaces does not tend to be sticky in the same manner as the material from step 23. However, it does contain an excessive amount of moisture, which can be removed by drying in step 27. The drying operation can be substantially the same as previously described for step 22. After drying, the material can have a final total moisture content of the order of 4%.

Assuming that it is desired to make a dry whole milk, a refined or purified butter can be employed for preparing the emulsion. Butter can be refined or purified to a desired degree by known treatment methods, comprising for example washing with fresh water to reduce the lactose content, and centrifuging at a temperature above its melting point. The amount of emulsion added to the dry material depends upon the fat content desired in the final product. For a dry whole milk it is desirable to provide a fat content of the order of from 24 to 28%. For dried cream the fat content can be of the order of 50 to 70%. It will be evident that if the proportions used between the purified butter or other fat and water in preparing the emulsion vary from the proportions just mentioned, then the amount of emulsion must be adjusted accordingly to produce a desired fat content in the final product.

A wire variety of edible oils and fats can be used, in addition to refined butter or butterfat. For example I can use various oils and fats of vegetable origin, such as corn oil, coconut butter, coconut oil, cottonseed oil, peanut oil, olive oil, sesame oil and soybean oil. As natural fats of animal origin I can use lard, lanolin, tallow and oleo oil. Fish oils can be used, although their odor and flavor characteristics are generally objectionable. All of the foregoing vegetable and animal oils or fats can be subjected to more or less hydrogenation to remove objectionable flavor characteristics, and to provide a fat of desired melting point and viscosity. Various flavoring ingredients, such as the flavoring of natural butter, can be added to the fats mentioned above.

Where it is desired to fortify the final product with vitamins, both fat and water soluble vitamins can be added to the fat-water emulsion, and thus incorporated in the final dry material.

Assuming the use of skim milk as a raw source of milk solids, and the use of purified butter for the source of fat, with proportions to produce a dry product having an analysis corresponding to whole milk, the product possesses many desirable characteristics which distinguish it from conventional whole milk powder. Previous reference has been made to the fact that the specific gravity of the product before addition of the fat, is of the order of 0.27 to 0.39. The fat content increases the specific gravity according to the amount employed. Assuming addition of purified butter in an amount to produce a product corresponding to dried whole milk, the bulk weight of the finished product is of the order of 350 gms. per liter, as distinguished from a bulk weight of about 630 gms. per liter for a conventional spray dried whole milk powder. The solubility index remains substantially the same as that of the aggregated dry skim milk. The product is yellow in color, and there is no visible evidence of filming upon the surfaces of the aggregates.

The desirable properties of the above whole milk product in contrast with conventional whole milk powder, can be demonstrated as follows: When a spoonful of conventional spray dried whole milk powder is dropped into a tumbler containing a quantity of warm water, the powder tends to float upon the surface of the water and if the contents of the tumbler are permitted to stand without stirring, the powder forms a sticky mass. When this test is applied to the material made by the present method, the bulk of the material floats upon the surface of the warm water for only a short interval and immediately progressive sinking occurs. As the material sinks it disintegrates and disperses. If one should attempt to stir the contents of the tumbler after adding conventional spray dried whole milk powder, the powder takes the form of sticky lumps and masses and relatively vigorous agitation or beating is required over a substantial period of time in order to break up the lumps and effect complete dispersion. With the present product a simple stirring as by means of a spoon or moderate shaking, serves to rapidly disintegrate and completely disperse the material, to form a stable reconstituted whole milk.

In the foregoing, reference has been made to use of warm water to reconstitute the powder. The temperature of the water should be at or above the melting point of the fat, as for example 110 to 120° F. for purified butter.

In general the physical character of the aggregates making up the product is the same as the physical nature of the skim milk product produced as a result of steps 23 and 24. Thus as viewed by microscope the particles of the powder are in the form of random aggregates in which the individual particles of the original spray dried powder are attached together in a random fashion to form aggregates which vary widely as to shape. The fat content is largely absorbed into the pores of the aggregates.

Wettability of the product made as described above, comprising skim milk solids together with sufficient purified butter to provide an analysis corresponding to dry whole milk, can be determined by the laboratory method described in said copending application Serial No. 370,420. The method used for this purpose employed a 16 mm. test tube filled to within 1 cm. of the top with distilled water at 120° F. A gram of the sample being tested was dropped upon the surface of the water, and the time for the powder to wet completely was measured. This test was carried out on a number of samples of commercial spray dried skim milk and commercial spray dried whole milk, and the results compared with samples of the present product. The commercial spray dried skim milk powder required from 210 to 360 seconds for complete wetting in water at a temperature of 120° F. The commercial spray dried whole milk powder was not completely wet in one hour. Samples of the present product, having an analysis corresponding to whole milk powder, required only from 39 to 41 seconds for complete wetting. Thus, it is apparent from the foregoing that the present product has high wettability.

The effect of the aggregates making up the product and the manner in which the fat is incorporated with the product, appear to be important factors in securing the desired characteristics. In general we believe it desirable for the bulk of the material to be of a size such that it will remain on a 200 mesh screen, or in other words greater in size than 200 microns. Particles of such size are easily perceptible to the naked eye, whereby the particles of conventional skim milk powder are not.

It will be evident that the present method can be used to produce a dried whole milk which is superior in many respects to conventional whole milk powder. For ordinary domestic use the product is desirable because one can prepare a stable reconstituted milk without vigorous or prolonged agitation. It has free flowing characteristics and therefore it is easy to remove from a container, and it can be poured from a spout without plugging or caking. A conventional spray dried whole milk powder cannot be poured from an ordinary spout such as one used on conventional retail salt packages.

The product is relatively non-hydroscopic in that when exposed to the air it does not tend to cake, whereas conventional whole milk powder tends to absorb moisture and cake.

It is well known that the flavor of conventional spray dried whole milk powder is impaired by certain factors involved in its treatment, which are not clearly understood. According to my observations such flavor impairment may be due in part to the processing of the non-fat milk solids together with the fat content. In this connection it is known that spray dried skim milk powder is not subject to the same flavor impairment as spray dried whole milk powder. The present method makes it possible to produce a dried whole milk product which has good flavor characteristics, and particularly avoids flavor impairment such as is experienced in the processing of whole milk powder. It will be evident that this is due to the fact that the non-fat milk solids and the fat content are processed separately, and then combined after the non-fat milk solids have been placed in the form of a granular aggregated product.

A fat content, such as butter fat or purified butter is subject to development of rancidity when stored in unsealed containers or exposed to the air. Even when placed in sealed containers immediately after manufacture, some progressive oxidation of fats tends to occur through auto-oxidation. Such tendency toward rancidity can be offset by use of small amounts of a suitable oxidation inhibiter. For example I can use small amounts of Tenox 11 (e.g. 1 part Tenox 11 to 2000 parts fat) dissolved in the fat content, before it is applied as an emulsion to the aggregated dry milk solids. Tenox 11 is made by Tennessee Eastman Company and is a combination of butylated hydroxy anisole, propylgallate and citric acid. In this way I can provide a dry whole milk which has excellent flavor characteristics and which has good keeping characteristics with respect to development of rancidity.

In the foregoing I have referred to skim milk as a source of material for non-fat skim milk solids, and it is evident that I can use any similar lacteal material. For example, the analysis of the skim milk with respect to its protein and lactose contents can be varied somewhat as by removing or adding lactose, or removing or adding some casein. In any event the material should have sufficient casein and lactose to be susceptible to treatment in the manner described herein to cause the particles of the initially spray dried material to become momentarily sticky and to adhere together to form aggregates.

I claim:

1. A method for the manufacture of a fat containing dry food product which is readily dispersable in water to form a reconstituted fat containing milk product, comprising continuously moistening nonfat dried milk particles in dispersed condition, causing said moistened particles while dispersed in a treatment zone to contact and permanently adhere together in the form of light, porous, random aggregates of a size substantially greater than the size of the particles, said aggregates leaving said zone in dispersed condition having a total moisture content of from 10 to 20%, and removing excess moisture from the aggregates to provide a product having a moisture content of the order of less than 6% without any substantial amount of crushing of the aggregates, said last named product being a free flowing granular material, said method being further characterized by the step of adding a fat to said porous aggregates and causing the fat to be absorbed by the porous aggregates.

2. A method as in claim 1 in which the added fat is butter fat.

3. A method as in claim 1 in which the fat is added to the aggregates after said step of removing excess moisture.

4. The method as in claim 2 in which said fat is applied as a fat-water emulsion, and in which moisture is again removed from the aggregates after the fat-water emulsion has been applied.

5. The method as in claim 1 in which the added fat is applied at a temperature above its melting point.

6. A method for the manufacture of a fat containing dried food product which is readily dispersible in water to form a fat containing reconstituted milk, comprising causing a stream of nonfat milk powder containing anhydrous lactose and milk protein, in a dispersed condition in a treatment zone, to be moistened by adding thereto an amount of moisture sufficient to provide the powder with a total moisture content of from 10 to 20%, the added moisture serving to make the dispersed particles sticky, causing the sticky particles when dispersed in said treatment zone to contact and adhere together in the form of light, porous, random aggregates leaving said zone in dispersed condition and of a size substantially greater than the particle size of the original powder, removing excess moisture from the aggregates to provide a product having a moisture content of the order of less than 6% without substantial coagulation of the protein or any substantial amount of crushing of the aggregates, said last named product being a free-flowing granular material having a density substantially less than that of the original milk powder, and then adding a fat to said last named product, the fat being homogeneously distributed and caused to be absorbed in the pores of the aggregates.

7. A method as in claim 6 in which the milk powder is spray dried skim milk.

8. A method as in claim 6 in which the fat is applied to the aggregates as a fat-water emulsion, and in which after applying said fat-water emulsion, the aggregates are subjected to further drying for the removal of moisture therefrom.

9. A method as in claim 8 in which the emulsion contains an emulsifying agent.

10. A method for the manufacture of a fat containing dried food product which is readily dispersable in water to form a fat containing reconstituted milk product, comprising continuously moistening nonfat dried milk particles in dispersed condition whereby they become sticky, continuously causing said moistened nonfat particles while dispersed in a treatment zone to contact and adhere together in the form of light, porous, random aggregates, leaving said zone in dispersed condition and of a size substantially greater than the size of said particles, collecting and removing the aggregates continuously in a quiescent uncompressed mass for a period of time such that the aggregates are rendered firm and substantially less sticky, removing excess moisture from the aggregates to provide a final product having a moisture content of the order of less than 6% without any substantial amount of crushing of the aggregates, the last named product being a free-flowing granular material, applying a fat-water emulsion to said last named product whereby the fat is homogeneously distributed on the aggregates and caused to be absorbed in the pores thereof, and then removing excess moisture from the fat containing aggregates.

11. A dried food product comprising porous aggregates, the aggregates consisting of smaller particles of nonfat milk powder firmly adhered together in random fashion to form a free-flowing divided material, said aggregates containing a fat absorbed within the pores of the same, the nonfat milk solids present forming a stable milk when dispersed in water, the product being characterized by high wettability and by its ability to quickly disperse in water by simple stirring to form a stable reconstituted milk product, the major portion of the aggregates having a size such that they remain upon a 200 mesh screen.

12. A product as in claim 11 further characterized by the fact that it has a specific gravity ranging from about 0.27 to 0.39.

13. A dried milk product as in claim 11 in which the product has a specific gravity ranging from 0.27 to 0.39, in which a substantial portion of the lactose content of the product is in crystalline form, and in which an emulsifying agent is associated with the fat.

References Cited in the file of this patent

UNITED STATES PATENTS

| | | |
|---|---|---|
| 1,202,130 | Vasey | Oct. 24, 1916 |
| 1,808,730 | Bornegg | June 2, 1931 |
| 1,937,527 | Otting | Dec. 5, 1933 |
| 2,016,592 | Chuck | Oct. 8, 1935 |
| 2,174,734 | Chuck | Oct. 3, 1939 |
| 2,399,565 | North et al. | Apr. 30, 1946 |

FOREIGN PATENTS

| | | |
|---|---|---|
| 297,256 | Great Britain | Sept. 20, 1928 |

UNITED STATES PATENT OFFICE
CERTIFICATE OF CORRECTION

Patent No. 2,911,300                                                                    November 3, 1959

David D. Peebles

It is hereby certified that error appears in the printed specification of the above numbered patent requiring correction and that the said Letters Patent should read as corrected below.

Column 2, line 1, for the number "2,835,568" read -- 2,835,586 --; column 3, line 70, for "power" read -- powder --; line 71, after "say" insert -- from --; column 5, line 64, for "wire" read -- wide --.

Signed and sealed this 10th day of May 1960.

(SEAL)
Attest:

KARL H. AXLINE                                                          ROBERT C. WATSON
Attesting Officer                                                   Commissioner of Patents